(12) United States Patent
Martin-Filippi (10) Patent No.: US 11,674,799 B1
(45) Date of Patent: Jun. 13, 2023

(54) FLOW-FOLLOWING APPARATUS AND METHODS OF USE

(71) Applicant: Margaux Martin-Filippi, Lone Tree, CO (US)

(72) Inventor: Margaux Martin-Filippi, Lone Tree, CO (US)

( * ) Notice: Subject to any disclaimer, the term of this patent is extended or adjusted under 35 U.S.C. 154(b) by 356 days.

(21) Appl. No.: 16/923,344

(22) Filed: Jul. 8, 2020

Related U.S. Application Data (60) Provisional application No. 62/871,568, filed on Jul. 8, 2019.

(51) Int. Cl.
*G01C 13/00* (2006.01)
*F15D 1/00* (2006.01)
*H01Q 15/14* (2006.01)
*G01S 19/13* (2010.01)

(52) U.S. Cl.
CPC ......... *G01C 13/006* (2013.01); *F15D 1/0035* (2013.01); *H01Q 15/14* (2013.01); *G01S 19/13* (2013.01)

(58) Field of Classification Search
CPC .... G01C 13/006; G01C 13/004; G01C 13/00; G01C 13/002; G01C 13/008; G01C 5/06; G01C 17/34; G01C 21/16; G01C 25/00; G01C 5/04; G01C 9/00; G01C 9/06; G01C 9/12; G01C 9/14; G01C 9/18
USPC .......................................... 73/170.29–170.34
See application file for complete search history.

(56) References Cited

U.S. PATENT DOCUMENTS

| | | | | |
|---|---|---|---|---|
| 4,089,218 A | * | 5/1978 | Cushing | G01F 1/584 73/861.15 |
| 4,145,921 A | * | 3/1979 | Blackwelder | G01P 5/01 73/170.16 |
| 4,161,118 A | * | 7/1979 | Banwell | G01C 13/002 73/170.15 |
| 4,466,281 A | * | 8/1984 | Rademakers | B63B 22/04 73/170.01 |
| 4,813,815 A | * | 3/1989 | McGehee | B63B 35/4406 405/224 |
| 4,924,698 A | * | 5/1990 | Echert | B63B 22/18 73/170.29 |
| 2016/0032888 A1 | * | 2/2016 | McCormack | F03B 13/264 415/60 |
| 2018/0031733 A1 | | 2/2018 | Ozgokmen et al. | |

* cited by examiner

*Primary Examiner* — Andre J Allen
(74) *Attorney, Agent, or Firm* — John Brooks Law LLC; John J. Brooks, III (57) ABSTRACT

Surface elements, such as protrusions, are provided for use on the surface of flow-following apparatuses, such as surface drifters or subsurface drogues, to enhance the hydrodynamic properties of the apparatus and enhance their capabilities to follow fluid motion. The protrusions may comprise helical strakes or splitter plates for optimizing the drag-to-inertia ratio of the flow-following apparatus, with the goal to enhance their flow-following capabilities. In some embodiments, the flow-following apparatus has a generally axisymmetric body shape, such as having a cylindrical, spherical or oblong shape. The flow-following apparatus may further comprise a position tracking device to track flow motion such as ocean currents.

20 Claims, 8 Drawing Sheets

FLOW-FOLLOWING APPARATUS AND METHODS OF USE

CROSS-REFERENCE TO RELATED APPLICATIONS

This application claims the benefit of U.S. application Ser. No. 61/871,568, filed on Jul. 8, 2019, entitled "FLOW-FOLLOWING APPARATUS AND METHODS OF USE," the entire contents of which are incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND

Technical Field

This disclosure relates to the shaping of flow-following bodies to affect their hydrodynamic properties. In particular, the disclosure relates to the use of protrusion on the exterior surface of a flow-following body in a flowing fluid to allow it to more accurately flow with the fluid.

Background

Monitoring and predicting ocean dynamics is essential for ocean circulation models and climate or weather models, from small, local scale to global, planetary scale. Small-scale ocean dynamics are used for coastal engineering applications or offshore oil platforms, while planetary-scale ocean dynamics are a key component of climate modeling and weather predictions. Our ability to track motion at the sea surface and/or within the water column is thus of high importance to understand the ocean and utilize maritime resources.

Ocean dynamics can be measured remotely, using sequences of instantaneous snapshots of velocity fields from radar or satellite data, or locally. Localized measurements come from either fixed instruments such as moored buoys, from autonomous vehicles, or from flow-following instruments, commonly called drifters or drogues. Drifters are buoyant instruments that float at the surface and track flow motion by recording the instrument's position over time. Drogues, typically, refer to subsurface drifters that are tethered to a surface buoy.

Present-day flow-following instruments perform rather poorly at tracking currents. Moreover, the majority of drifters are very cumbersome and fragile during handling and transport.

BRIEF SUMMARY

The following summary is included only to introduce some concepts discussed in the Detailed Description below. This summary is not comprehensive and is not intended to delineate the scope of protectable subject matter, which is set forth by the claims presented at the end.

Flow-following surface enhancements are disclosed for use with different flow-following devices and for use in different environments. Generally, the flow-following surface enhancements comprise surface elements of one or more protrusions positioned on the exterior surface of a flow-following apparatus. The protrusion on the surface enhance the capabilities of the apparatus by enhancing its hydrodynamic properties and allowing it to more accurately follow a motion of a fluid. The protrusions may be used on the exterior surface of an apparatus body such as on the exterior surface of a flow-following drifter or drogue. The protrusions may be an integral component of the body surface or they may be a separate element coupled to the surface of the body of the apparatus.

Some embodiments of the flow-following surface elements are utilized as a component of a flow-following apparatus such as, but not limited to, a fluid-following drifter that is adapted to be used as a platform for tracking and monitoring fluid currents. The flow following surface elements may be used for drifters (or drogues, here clumped together within the definition of drifter and flow-following apparatus) as a self-comprising one-piece drifter, or the surface elements may be used as a shape or outer shell of a multi-component instrument suite.

In one example embodiment, one or more protrusion is provided and configured to be coupled to the surface of a flow-following apparatus whereby the flow-following apparatus more accurately follows a motion of a fluid. In some embodiments, the protrusion comprises one or more helical strake. In some embodiments, the protrusion comprises one or more splitter plate.

In one example embodiment, a flow-following apparatus is provided comprising a body having an exterior surface and one or more protrusion coupled to the exterior surface whereby the flow-following apparatus more accurately follows a fluid motion. In some embodiments, the body is axisymmetric. In some embodiments, the body is cylindrical. In some embodiments, the protrusion comprises a helical strake extending across a portion of the exterior surface, the body is hollow, and the body is configured to float at a surface of the fluid through a positive buoyancy with the body being submerged below the surface and an antenna above the surface.

In some embodiments, an apparatus having the flow-following elements, a flow-following apparatus, uses the surface elements (e.g., protrusions) to diminish vortex shedding by breaking the vortex streets, with the goal to avoid instabilities and vibrations and to optimize the drag-to-inertia ratio of the drifter or drogue. The protrusions may also help reduce the boundary layer effects. These protrusions are typically normal to the direction of the flow or can be encircling the surface of the drifter that is normal to the flow.

In some embodiments, the flow-following apparatus may also include variable buoyancy features that allow the buoyancy of the apparatus to be adjusted to a desired depth given the size of the drifter. For example, a surface drifter would be positively buoyant whereas a subsurface drogue would have its buoyancy adapted to the desired depth or pressure.

In one example embodiment, a protrusion assembly is provided comprising a surface element having a length being greater than its width and height, and the surface element configured to be coupled to a surface of a flow-following apparatus to define one or more protrusion from the surface whereby the flow-following apparatus more accurately follows a motion of a fluid when the flow-following apparatus is in the fluid. In some embodiments, the surface element comprises a helical surface element having an arcuate cross-sectional profile, and the helical surface element having an open and continuous shape whereby when the helical surface element is coupled to the surface of the flow-following apparatus, the surface element defines a helical strake on the surface of the flow-following apparatus. In some embodiments, the flow-following apparatus comprises an axisymmetric body, and the helical strake on the surface of the flow-following apparatus is configured to reduce a vortex shedding caused by the flow-following apparatus in a flow of the fluid. In some embodiments, the axisymmetric body has a spherical shape. In some embodiments, the axisymmetric body is axisymmetric about a longitudinal axis and the length of the helical strake is configured to allow the helical strake to make at least two revolutions around the longitudinal axis and the surface of the flow-following apparatus. In some embodiments, the surface element comprises a cylindrical surface element whereby when the cylindrical surface element is coupled to the surface of the flow-following apparatus, the cylindrical surface element defines a splitter plate on the surface of the flow-following apparatus. In some embodiments, the flow-following apparatus comprises a cylindrical body, and the splitter plate on the surface of the flow-following apparatus is configured to reduce a vortex shedding caused by the flow-following apparatus in a flow of the fluid.

In one example embodiment, a flow-following apparatus is provided comprising a body having an exterior surface and one or more protrusion coupled to the exterior surface whereby the flow-following apparatus more accurately follows a motion of a fluid. In some embodiments, the body is an axisymmetric body. In some embodiments, the one or more protrusion comprises a helical strake extending across a portion of the exterior surface. In some embodiments, and the helical strake on the exterior surface of the axisymmetric body is configured to reduce a vortex shedding caused by the axisymmetric body in a flow of the fluid. In some embodiments, the helical strake has an arcuate cross-sectional profile. In some embodiments, the axisymmetric body is axisymmetric about a longitudinal axis, and a length of the helical strake is configured to allow the helical strake to make at least two revolutions around the longitudinal axis and the exterior surface of the axisymmetric body. In some embodiments, the axisymmetric body is hollow and the axisymmetric body is configured to float at a surface of the fluid through a positive buoyancy with the axisymmetric body being submerged below the surface and an antenna above the surface. In some embodiments, the body is a cylindrical body. In some embodiments, the flow-following apparatus further comprises a top face on a top of the exterior surface, a bottom face on a top of the exterior surface, and wherein the one or more protrusion comprises a splitter plate at the top face and the bottom face. In some embodiments, the body is spherical having a longitudinal axis, and the one or more protrusion comprises a helical strake extending at least two revolutions about the longitudinal axis and across the exterior surface. In some embodiments, the body is oblong having a longitudinal axis, and the one or more protrusion comprises a helical strake extending at least two revolutions about the longitudinal axis and across the exterior surface.

In some embodiments, the flow-following apparatus further comprises a position tracking device or a radar reflector.

It is understood that the disclosed flow-following apparatus can be used in many different environments including, but not limited to, geophysical environments such as the jovian atmosphere and liquid environments such as the earth's oceans, lake and rivers.

For the sake of clarity in the descriptions, and not for limitation, the following detailed description will refer to the flow following apparatus as a "flow-following apparatus", "drifter" and "drogue" interchangeably which shall refer to any flow-following apparatus or device.

Other objects, features, and advantages of the techniques disclosed in this specification will become more apparent from the following detailed description of embodiments in conjunction with the accompanying drawings.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Flow-following apparatuses and methods of use will now be described in detail with reference to the accompanying drawings. It will be appreciated that, while the following description focuses on a system that increase the accuracy of flow-following apparatuses, the systems and methods disclosed herein have wide applicability. For example, the flow-following apparatus described herein may be readily employed to reduce fluid dynamic forces on bodies in a gaseous flow. Not with standing the specific example embodiments set forth below, all such variations and modifications that would be envisioned by one of ordinary skill in the art are intended to fall within the scope of this disclosure.

Generally, embodiments of the flow-following apparatus and protrusion assemblies are configured to improve the ability of flow-following devices to follow the flow of a fluid. In embodiments, the apparatus and assemblies address the resulting fluid dynamic forces that can decrease the accuracy of their ability to follow a fluid flow. In some example embodiments, the apparatus and assemblies are configured to reduce forces from vortex shedding caused by a body in the flow of a fluid. As described, these forces are generally addressed by incorporating protrusions on the exterior surface of the flow-following body.

Example Embodiments of a Flow-Following Apparatus

Generally, the flow-following apparatus is a fluid-following device used as an instrument platform for tracking and monitoring fluid currents. The flow-following apparatus is configured to incorporate flow-following surface elements, such as one or more protrusions, to diminish vortex shedding to improve performance of the apparatus.

In one example embodiment, for illustrative purposes and not for limitation, the flow-following apparatus is a water-following drifter used as an instrument platform for tracking and monitoring water currents. Generally, referring to FIG. 1A, example embodiments of the drifter 100 comprise: (1) a body 120 having an exterior surface 130 and (2) one or more protrusions 160 extending across a portion of the exterior surface 130. In some embodiments, the drifter 100 may further comprise a data collection means such as, but not limited to, a data collection device or a position tracking device.

In some embodiments, the body and protrusions may be separately configured for use with other components, such as instruments and sensors, as one component of a multi-component drifter.

In some embodiments, the drifter may further comprise communication means, buoyancy features, ballasting features and mounts to attach components such as the communication means or to help with the release and deployment of the drifter.

Figure 6A:
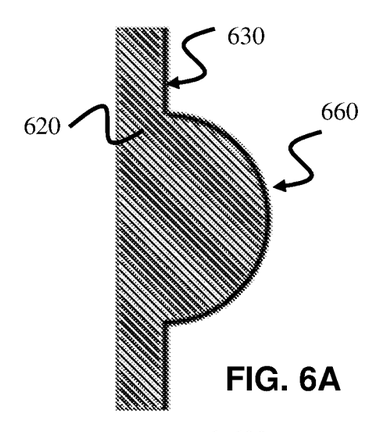
FIGS. 6A-6F illustrate additional cross-sectional profiles of example protrusions.
Figure 6B:
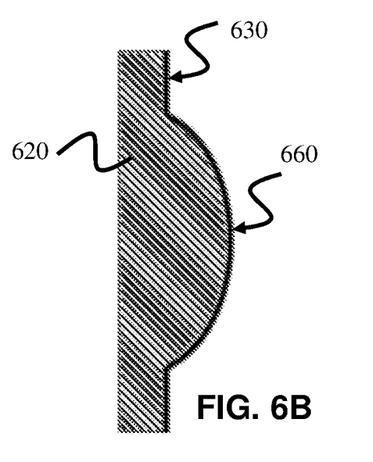
Figure 6C:
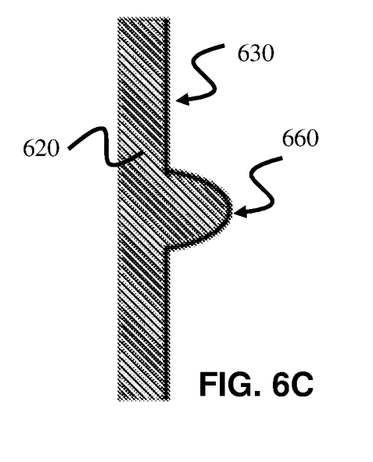
Figure 6D:
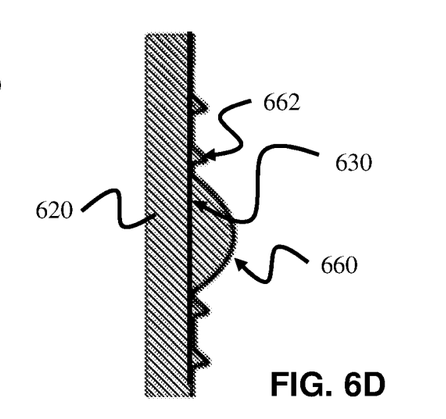
Figure 6E:
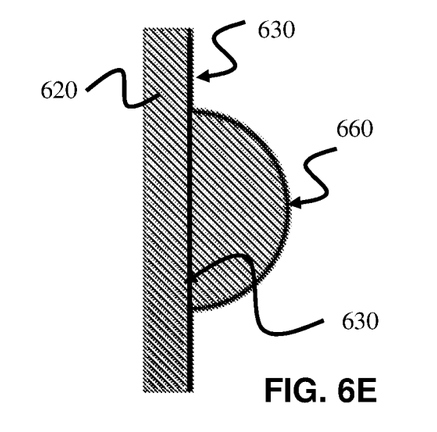
Figure 6F:
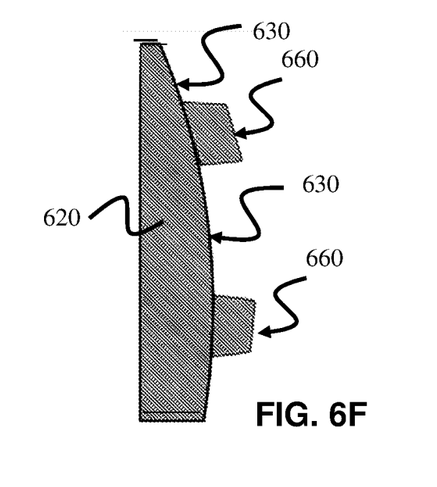

In some embodiments, with one example embodiment illustrated in FIGS. 6D-6F, the protrusions 660 may be provided by a separate protrusion assembly having surface elements to define protrusions 660 on the surface of the flow-following apparatus. In these embodiments, the surface elements may be configured to be coupled to the outer surface 630 of the body 620 of a flow-following apparatus or as part of a separate outer shell of a multi-component suite that can be coupled to the apparatus. In some embodiments, the surface element has a width, a height and a length being greater than the width and the height. In some embodiments, the surface element comprises a helical surface element having an arcuate cross-sectional profile and an open and continuous shape whereby when the helical surface element is coupled to the surface of the flow-following apparatus, the surface element defines a helical strake on the surface of the flow-following apparatus. In some embodiments, the surface element comprises a cylindrical surface element whereby when the cylindrical surface element is coupled to the surface of the flow-following apparatus, the cylindrical surface element defines a splitter plate on the surface of the flow-following apparatus.

The hydrodynamics properties of the disclosed drifters are enhanced by including the protrusions that act as vortex-street breakers, including splitter plates and helical strakes. Helical strakes are used in the oil industry, among others, to mitigate vortex induced vibrations on oil pipes. When a bluff body encounters fluid motion, vortices are generally shed in its wake. Vortex streets typically refer to the pattern of vortex shedding, with vortices swirling in alternating direction. The pressure difference created by vortex shedding affects the drag of the object in water. Bluff bodies can be faired to streamline the flow, as is sometimes the case of oil pipes, for example. In the case of a drifter where the flow is potentially omnidirectional, the fairing would need to be omnidirectional as well. These protrusions are typically implemented normal to the direction of the flow or can be encircling the surface of the drifter that is normal to the flow. Helical strakes along a cylindrical drifter or spiraling along a spherical drifter, for example, prevent vortex formation in all directions.

Another role of the protrusions in enhancing the water-following properties of the drifter is that they minimize the boundary layer and thereby reduce the boundary layer effects. The thinner the boundary layer, the more hydrodynamic the drifter.

One purpose of reducing the drag of the drifter in water is to optimize the drag-to-inertia ratio, with the inertia being easier of the two variables to modulate. In the ideal case, the drifter acts as a passive tracer that is able to perfectly follow the flow. Drifters with high inertia do not perform well when the flow changes direction, such as during the reversal of a tide; drifters with high drag, on the other hand, tend to lag behind the currents. Moreover, most drifters in existence are not axisymmetric, which leads to their drag being dependent on the direction of the incoming current and furthermore hinders their ability to track changes in current direction. A drifter with a high propensity to follow the fluid motion and with low windage will have a trajectory that is an accurate representation of the fluid flow motion, which enables the accurate measurement of ocean currents, ocean eddies and other ocean physics phenomena.

The Body

Figure 1A:
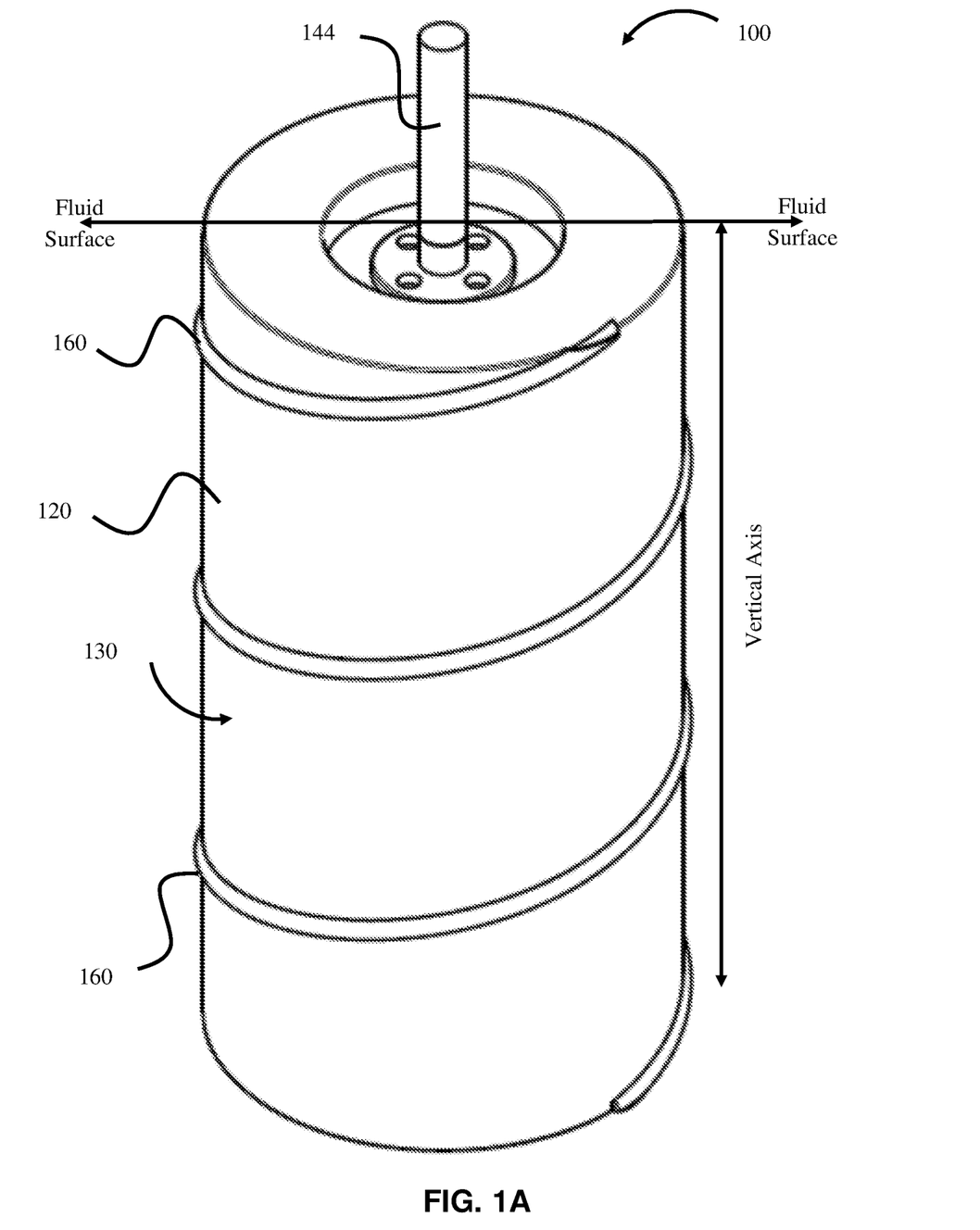
FIG. 1A shows a top perspective view of an example embodiment of the flow-following apparatus being a cylindrical surface drifter with helical strakes acting as vortex street splitters.

Referring to FIG. 1A, the body 120 of the drifter 100 is generally axisymmetric along its longitudinal or vertical axis (shown) having an exterior surface 130. The body 120 may be shaped to define a curved exterior surface 130 that is radially curved along the vertical axis. Examples of suitable body shapes include a cylinder (see FIGS. 1A-1C and FIGS. 2-2B), a sphere (see FIG. 3A), or a cylinder that has been faired at the top and bottom into teardrop-like shapes (see FIG. 4). The body may also be hollow or otherwise buoyant.

The exterior surface 130 may be smooth to some extent while having enough rugosities to allow the formation of a very thin boundary layer and reduce friction with the outside environment. These rugosities from the surface roughness are inherent to the manufacturing process and the material. (See rugosities 662 in FIG. 6D.) The surface roughness is adjusted only up to a certain level, through processes such as polishing.

In some embodiments, the drifter 100 is a hollow cylinder floating at the surface such that only the top antenna 144 is emerged above the surface of the water (see FIG. 1A). The drifter may be constrained by positive buoyancy and follows the surface currents.

Protrusions

Referring again to FIG. 1A, the protrusions 160 generally comprise surface elements that extend outward from the exterior surface 130 of the body 120 of the drifter. The protrusions 160 may comprise any type of irregular feature on the exterior surface 130 of the drifter body 120 that are designed and added to enhance the water-following properties of the drifter 100, such as affecting the shedding of vortices around the drifter 100 in a manner that optimizes its drag-to-inertia ratio.

Generally, the protrusions 160 are specific, irregular features on the exterior surface 130 of the body 120 that affect its hydrodynamic properties. In some embodiments, the protrusions are similar to strakes such as a protruding ridge fitted to an aircraft or other structure to improve the aerodynamic stability of the structure.

Figures 1B, 1C:
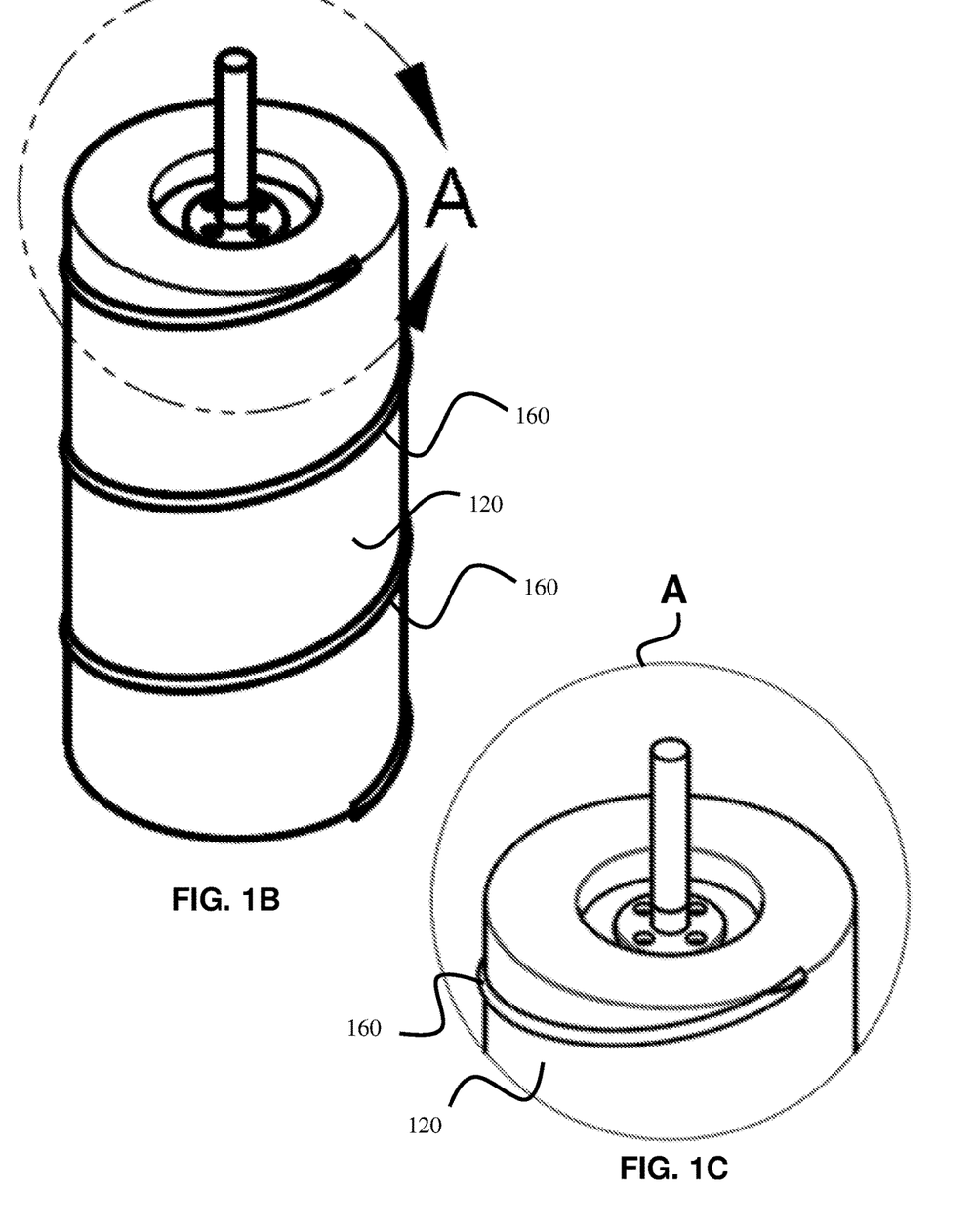
FIGS. 1B shows a side view of the embodiment of FIG. 1A also identifying the detail view of FIG. 1C.
FIG. 1C shows the detail view of section A from FIG. 1B.

In the example embodiment of FIG. 1A, a cylindrical drifter 100 is configured to float at the surface of a body of water (see "Fluid Surface" shown). Floating at the surface means that the majority of the drifter is submerged with only a small part emerged; ideally, only parts of the antenna 144 are emerged. Although any amount of protrusion coverage on or extension across the exterior surface 130 of the body 120 may help enhance the hydrodynamic and water-following properties of the drifter 100, the water-following properties are specifically enhanced by protrusions 160 that encircle the perimeter of the exterior surface throughout the height (along its vertical axis). For example, the protrusion 160 shown is in the shape of a continuous helix with three revolutions that encircles the exterior surface of the cylinder such that the vortex shedding is lessened in all directions of the measured flow and throughout the length of the drifter. The protrusions 160 are shown in FIG. 1A and in the profile of the same example in FIG. 1B. A zoom-in on the protrusions 160 is shown in FIG. 1C, which corresponds to the section A in FIG. 1B. For drifters configured to follow currents at different heights and speeds, the number and thickness of the revolutions of the protrusions can be varied. These protrusions should be helical shaped and encircle or otherwise extend around a portion of the exterior surface or around one or more revolutions of the exterior surface of the cylinder. In this embodiment, the helical strake makes about three revolutions around the exterior surface.

In embodiments, the protrusions may also be referred to as strakes. In embodiments with a generally exterior side surface that is circular, such as with a cylindrical body, the protrusions may also be referred to as helical strakes that have a shape or form on the exterior surface similar to a helix or a spiral.

Figures 2A, 2B:
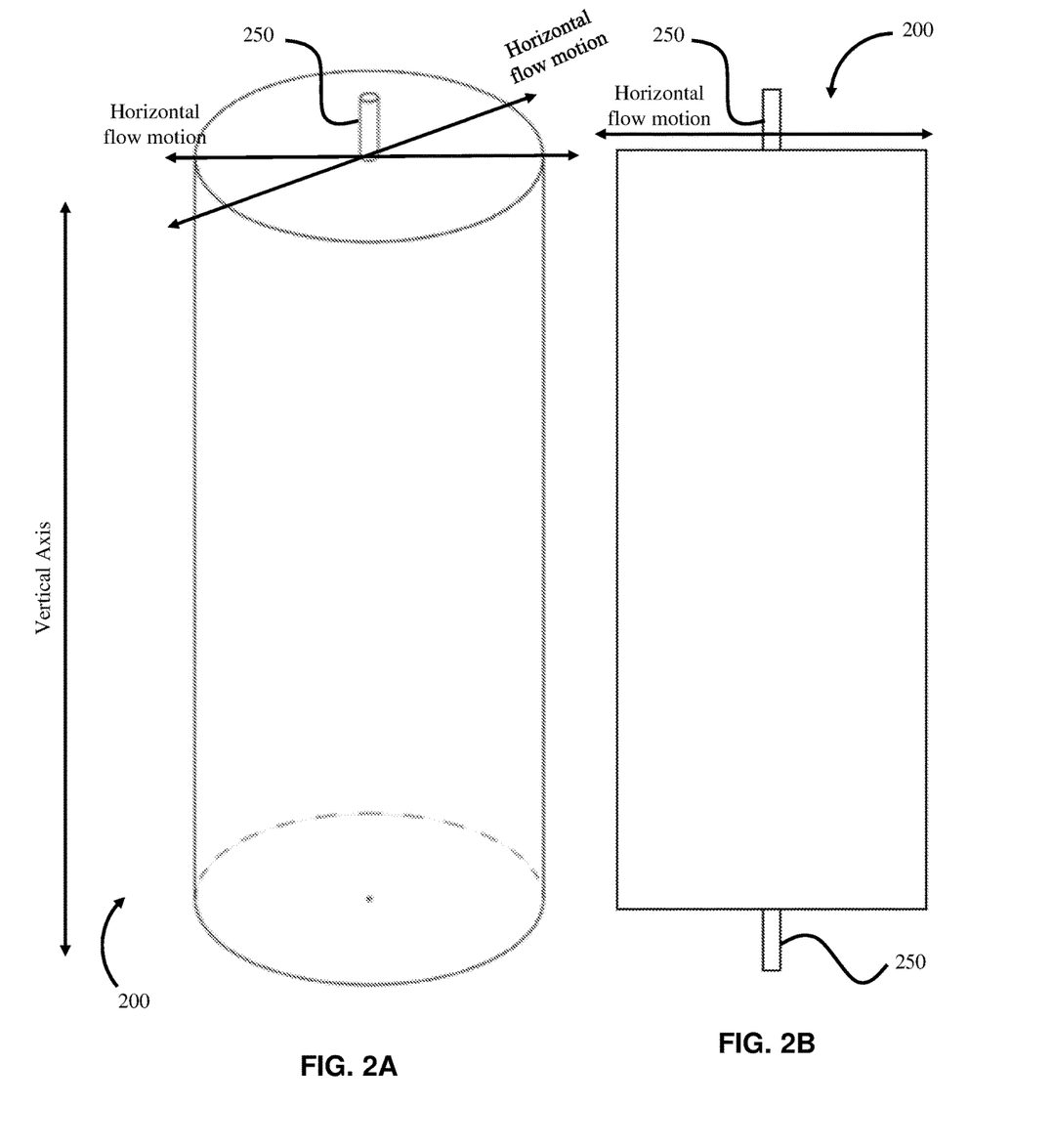
FIGS. 2A-2B illustrate an example embodiment of the flow-following apparatus being a subsurface drogue with vertical splitter plates for vortex shedding prevention and weakening of the top and bottom boundary layers.

In the example embodiment of FIGS. 2A-2B, the water-following properties may be enhanced surface elements (e.g. protrusions) such as splitter plates 250 for the prevention of vortex shedding and of boundary layers formation at the top and bottom of the cylindrical drifter 200. These protrusions comprising splitter plates may be used as opposed to or in combination with protrusion such as strakes or helical strakes. The splitter plates are normal to the direction of the flow. For a cylindrical drifter configured to track currents at a fixed buoyancy surface, for instance, the plates can be vertical and mounted to the top and bottom faces of the cylinder. FIG. 2A shows an example of a drifter that follows currents in the horizontal and has a vertical splitter plate 250 at the top surface of the cylinder and a vertical splitter plate 250 at the bottom surface of the cylinder, both normal to the horizontal flow motion. In the FIGS. 2A-2B examples, cylindrical surface elements may act as splitter plates, but a wedge or a plate can also be used. The splitter plate is configured to break the vortex streets at the top and bottom surface of the drifter. This avoids the problem of strong boundary layer effects around the cylinder and helps enhance the drag-to-inertia ratio of the drifter.

In other embodiments, the protrusions may be used with other body shapes to diminish vortex shedding and/or boundary layer effects. For example, referring to FIG. 3A, protrusions 360 may be used for shapes such as the ball shaped body 320 shown. The spherical shape of the instrument allows similar flow-following properties in all directions, with the purpose to enhance the water-following properties in three-dimensions, enabling the drifter to follow currents in the vertical and the horizontal. In this example embodiment, the protrusions extend about two revolutions around the exterior surface. FIG. 3B shows a view of the example embodiment of FIG. 3A rotated 90 degrees and showing protrusions 360 and the ball shaped body 320. FIG. 3C shows a cutaway view of this embodiment along line A-A of FIG. 3B showing protrusions 360 and the ball shaped body 320.

Figure 3A:
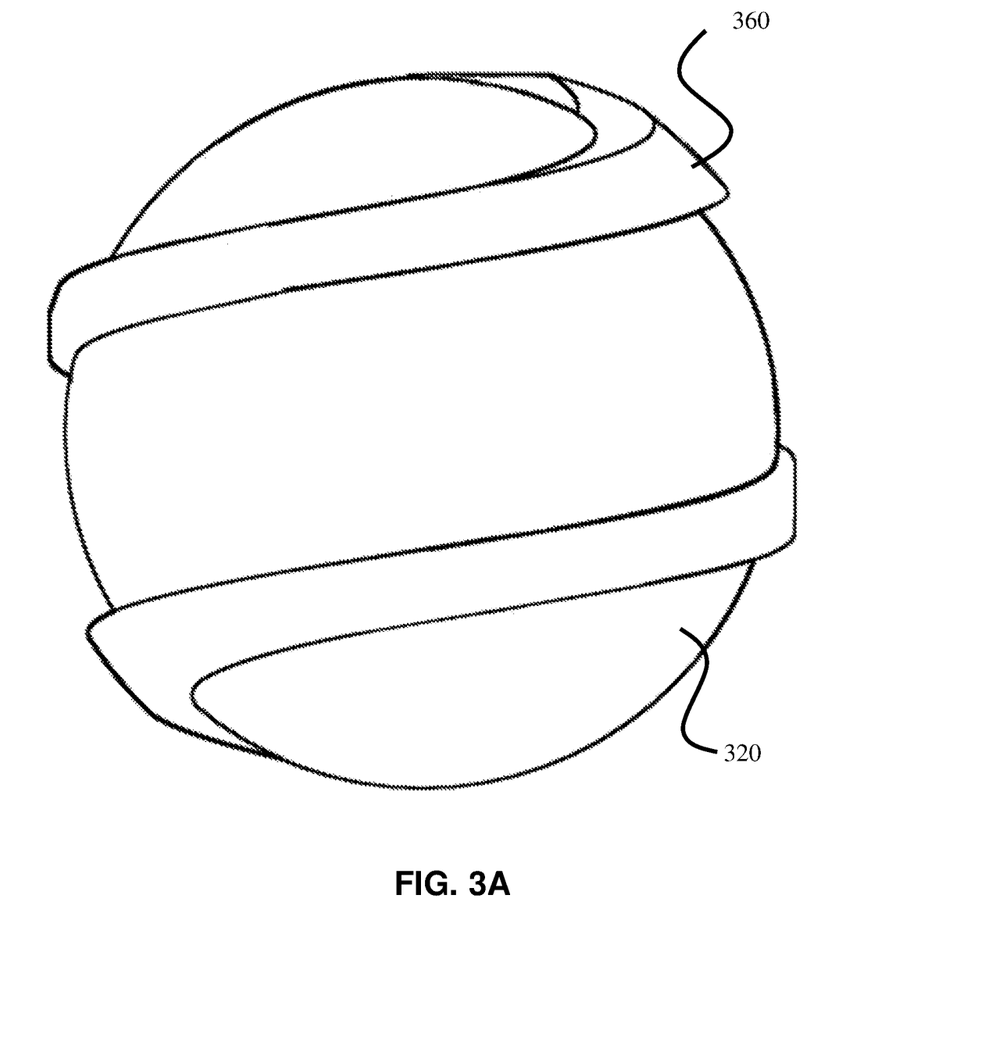
FIG. 3A illustrates an example embodiment of the flow-following apparatus being a spherical drifter or drogue shape: a ball with a helical strake spiraling in the vertical that covers its surface.
Figure 4:
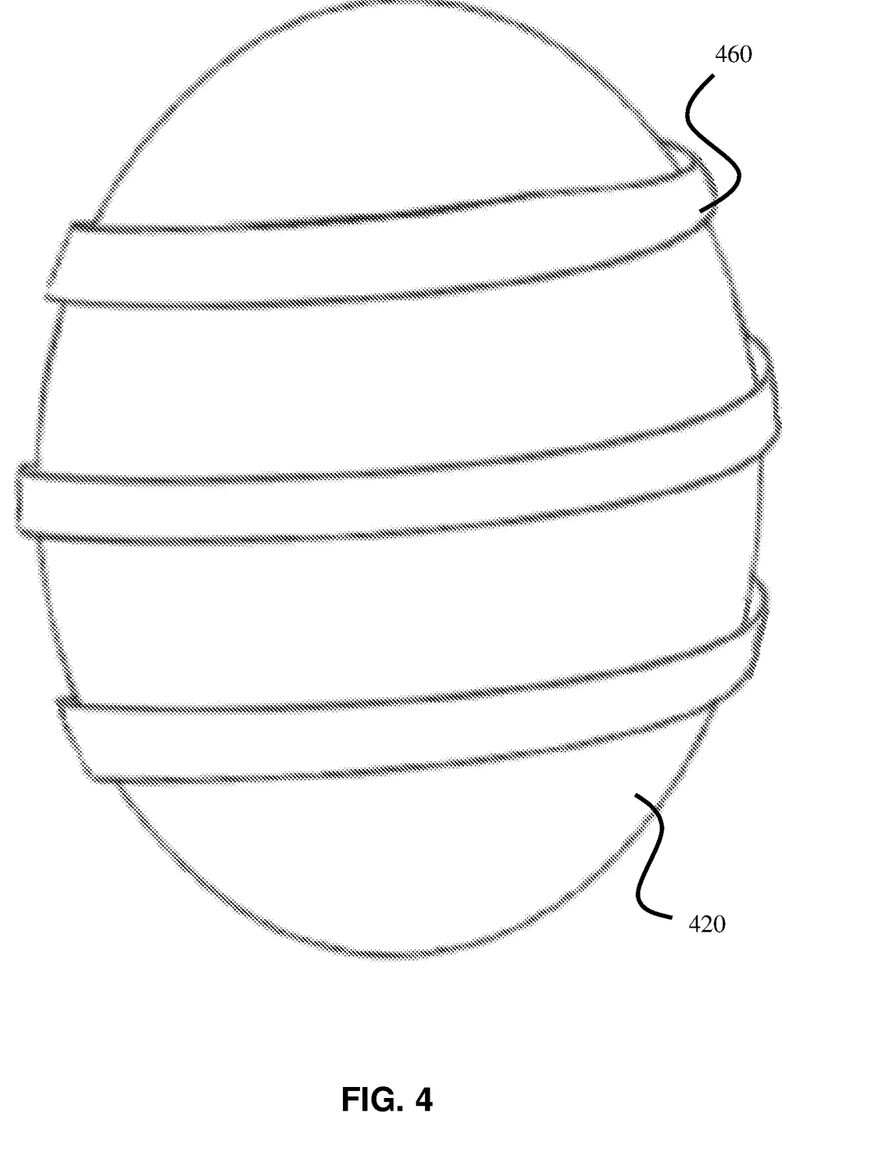
FIG. 4 illustrates an example embodiment of the flow-following apparatus being an oblong drifter or drogues: an ellipsoid with its major axis in the vertical and a helical strake spiraling in the vertical that covers its surface.

In the example embodiment of FIG. 4, the body 420 of the drifter is oblong in the vertical to streamline the drifter when going up and down the water column. The ratio of the axes of symmetry of the ellipsoid can be adjusted for fairing according to the expected horizontal and vertical velocities. The example features a protrusion 460, here, a helical strake, similar to the example in FIG. 3A, the helix shape is spiraling along the vertical axis. The protrusions 460 reduce vortex shedding in the horizontal and in the vertical.

Figure 5A:
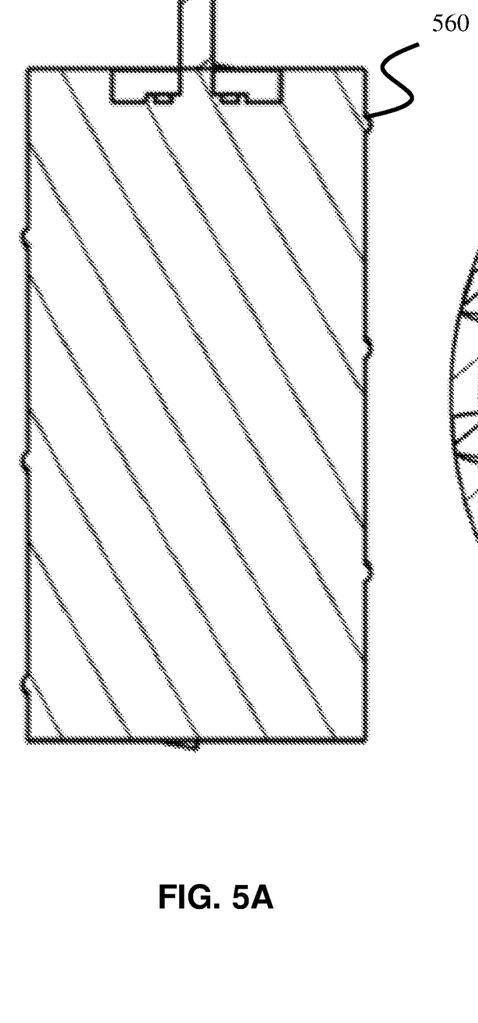
FIGS. 5A-5B illustrate two different cross-sectional profiles of several example embodiments consistent with the embodiments shown in FIG. 1A and FIG. 4.
Figure 5B:
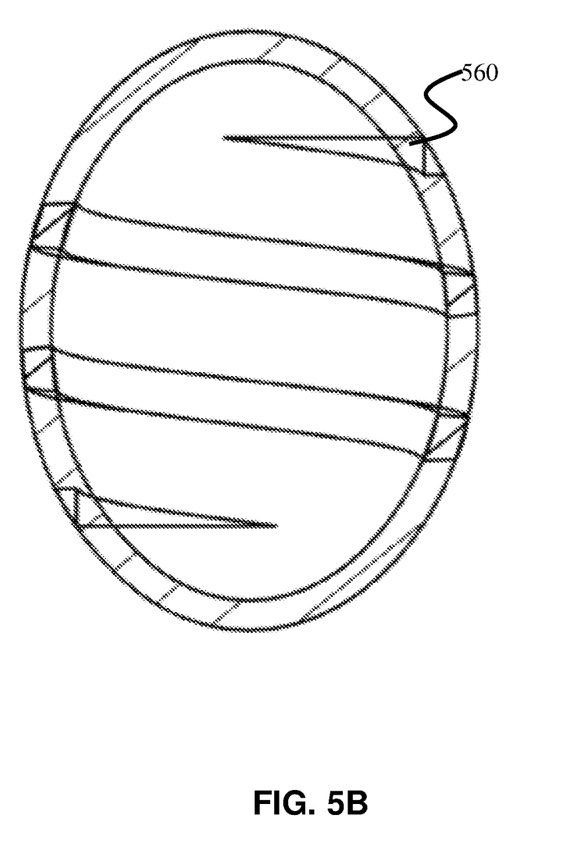

The number and the thickness of the protrusions may be adjusted for the applications. For example and not for limitation, a larger drifter built for tracking the Gulf Stream and its high velocities would require a different configuration than a small drifter built for coastal waters, which may require fewer helical revolutions. Double- or triple-helix shapes may also be used. Similarly, the vortex street splitter's size, shape and location may depend on the application and more than one may be used. The protrusion, here, the helical strake, itself can be rounded and faired for improved hydrodynamics. FIG. 1C features an example of a protrusion 160, here, a helical strake, that has been faired around its perimeter. The corresponding cross-section in FIG. 5A (which corresponds to FIG. 1C) illustrates the same protrusion 560 having rounded features extending outward from the exterior surface and the body. FIG. 5B (which corresponds to the cross section of the hollow drifter in FIG. 4) shows the curvature of the protrusions 560, here, a helical strake, as espousing the curvature of the body of the drifter. FIG. 6F features an example cross-section that shows the curvature of the body as well as the curvature of the protrusion coupled to the body.

The general shape of the protrusions may vary for different applications. For example, referring to FIG. 6A, the arcuate cross-sectional profile of the protrusions 660, here a helical strake, looks like a semi-disk on the exterior surface 630 of the body 620. Referring to the example embodiments shown in FIGS. 6B-6D and 6F, the shape and the width of the helical strake can vary. These protrusions 660 extend outward from the exterior surface 630 of the body 620 of a flow-following apparatus and differ from the rugosities 662 that are inherent to the material. They can be an integral part of the flow-following apparatus' surface 630, as in FIGS. 6A-6D, or they can be separate protrusion assemblies comprising separate elements coupled to its surface, as in 6E-6F. FIGS. 6A-6E illustrate profiles of protrusions 660 having an arcuate cross-sectional profile. FIG. 6F shows an example rectangular cross-sectional profile of protrusions 660.

Data Collection Means

In some embodiments, the drifter may further comprise a data collection means. The data collection means generally comprises any type of device configured to collect data collected by or generated by the drifter. In some embodiments, the data collection means comprises a data collection device such as a position recording device to track the position and thus the trajectory of the drifter over time. The data collection device can emit the positions, for example via satellite through the Global Positioning System (GPS) satellite network or the Iridium satellite constellation.

In some embodiments, a mount is attached, connected, embedded in or otherwise coupled to the drifter to allow for the coupling of the position recording and/or emitting device. This tracker records and, oftentimes, emits the position of the drifter over time. The drifter may be used stand-alone (typically with a tracking system for monitoring the fluid motion) device or as a platform for a suite of other instruments, off-the-shelf or custom-made.

Optional instruments that may be embedded within the drifter can include inertial measurement units (IMU) to measure velocity and orientation. The velocity sensor records the currents speed and allows for more accurate monitoring than the trajectories from satellite-emitted positions. The orientation sensor can record the tilt of the drifter, which indicates the amount of shear in the currents. For a surface drifter, the IMU can also measure the impact of surface waves on the drifter's motion. With the recent advances in IMU manufacturing, the chips are small and light enough to be installed inside the drifter without adding significantly to the payload.

Communication Means

In some embodiments, the drifter may further comprise a communication means to receive and/or transmit information from the drifter. The communication means may comprise any type of communications device configured to communication information to or from the drifter. For example, and not for limitation, a transceiver and an antenna may be used as a communication device to collect and/or transmit data to/from the drifter. The antenna may keep a recording device emerged from the flow being measured and facilitate the emission (or reception) of signals above the ocean surface. The antenna may be attached to the top face of the drifter by bolting its mount down inside a pocket. To the antenna may be mounted devices to ease with the recovery of the drifter, such as a radar reflector. On the opposite, the antenna may be set up and coated for stealth, with anti-laser absorbent paint for example. The design may also include fillets and chamfers for hydrodynamic fairing.

Buoyancy Features

In some embodiments, the drifter may further comprise buoyancy features. The drifter's buoyancy is mostly determined by the material selection and the hollowness of the instrument. In the examples provided, the cylinders, the oval and the ball may be hollowed. For the cylindrical surface drifter examples, the air trapped inside can render them positively or neutrally buoyant. The buoyancy, however, should be adjusted for the size of the drifter or drogue and for the desired depth or pressure. The density of the drifter is also dictated by the material selection. For cylindrical drifters at the surface, such as the example in FIG. 1A, the density may be varied along the height, with the top of the drifter less dense than the bottom to increase the drifter's stability in the fluid.

Materials

The drifters may be constructed at once, through additive manufacturing or injection molding, for example, or the design can be implemented by adding and mounting the protrusions, such as the splitters, the helices or the strakes, to existing drifters. Materials for such marine instruments can include any corrosion-resistant materials such as but not limited to galvanized steel, galvanized aluminum, plastics, bioplastics or any biodegradable materials, such as but not limited to those derived from bamboo, hemp or mycelium. The drifter may be engineered to be recovered along with the tracking devices and other instruments on the platform, or the instrument suite can be engineered to be recovered on its own with the platform left to biodegrade.

Description of One Example Embodiment of the Flow-Following Apparatus in Operation The following description uses the example of FIG. 1A in operation to illustrate some of the features and benefits of an example embodiment of the flow-following apparatus (also referred to as a drifter). In this embodiment, because the protrusions are integral to the drifter's body, the drifter is more robust, durable and reusable than other present-day flow-following drifters, including the CODE drifter. For the case where the helical protrusions are from a protrusion assembly and are added a posteriori to a drifter's body, the drifter is still compact and less likely to break than its counterparts, especially models that use retractable sails. This reduces the risk of breakage during handling, deployment or retrieval of the drifters, as well as while in operation when currents are very strong or in the case where a drifter beaches onto shore.

To be stored, the drifter may be stacked or kept upright by sitting on its base. The drifter may be released in water either by being thrown in the upright position or by being lowered to the water surface. The drifter is typically submerged with the top of the drifter a few centimeters below the surface and with the antenna partially emerged. The FIG. 1A example specifically includes a partially-emerged antenna mounted down inside a pocket, whose purpose is double: first, to protect the mount and the bolts from exposure to the outer flow and potentially high velocities; second, to ensure that the bolts remain immersed and mostly wet, as dried salt would magnify corrosion. In this embodiment, the antenna is the only emerged part of the drifter, as there is no external floatation device. This configuration enhances the water-following properties of the drifter because the surface drag or wind drag are minimum. The immersed part of the antenna also acts as a splitter plate for the boundary layer created above the top surface of the drifter. The immersed drifter is carried by the fluid flow or the currents. The position over time of the drifter is recorded by the position recording device and the trajectory of the drifter is used as a proxy for the motion of the water. For example, if the drifter loops around in circles, it may be trapped in an ocean eddy and if the drifter is meandering, it may be due to currents, and so forth. The drifter's position is generally emitted by a satellite device at regular intervals to allow remote tracking of the drifter. In this embodiment, the position recording device is fixed to the antenna so that it is emerged and can emit and/or receive signals more easily. The position recording device is preferably embedded within the antenna but can be exteriorly mounted. The drifter can also be used as a platform for other instruments, such as an IMU.

The axisymmetry of the drifter enables it to respond to fluid motion in the same fashion independently of the direction of fluid motion. This is in direct contrast to drifters that use submerged sails, where the sails' and drifter's response to the fluid flow will directly depend on the angular orientation of the drifter to the incoming current.

Furthermore, the revolutions of the helical strakes span the height of the drifter to reduce vortices throughout the height of the drifter as the fluid goes around the drifter on different horizontal planes, the helical strake hinders the formation of vortices in the wake of the drifter throughout the height. Wherever the fluid comes in contact with the drifter, it will encounter the helix at some point on the horizontal plane, which hinders the formation of a thick boundary layer on a vertical plane.

The buoyancy of the drifter is governed by properties such as the material it is made of and its hollowness through the thickness of the shell. Because of its buoyant design through material selection and hollowness modulation, the drifter does not need exterior components to help with floatation, in direct contrast with the commercially available drifters that use polystyrene floats attached to the sails to keep the drifter afloat and upright. The density may be minimum at the top of the drifter and maximum at the bottom to ensure that the drifter remains upright even under wave action. The bottom may be made denser by increasing the thickness of the shell at the base while keeping the top very hollow. Not needing floaters that are emerged is an improvement as it does not add more surface drag and avoids windage.

Figures 3B, 3C:
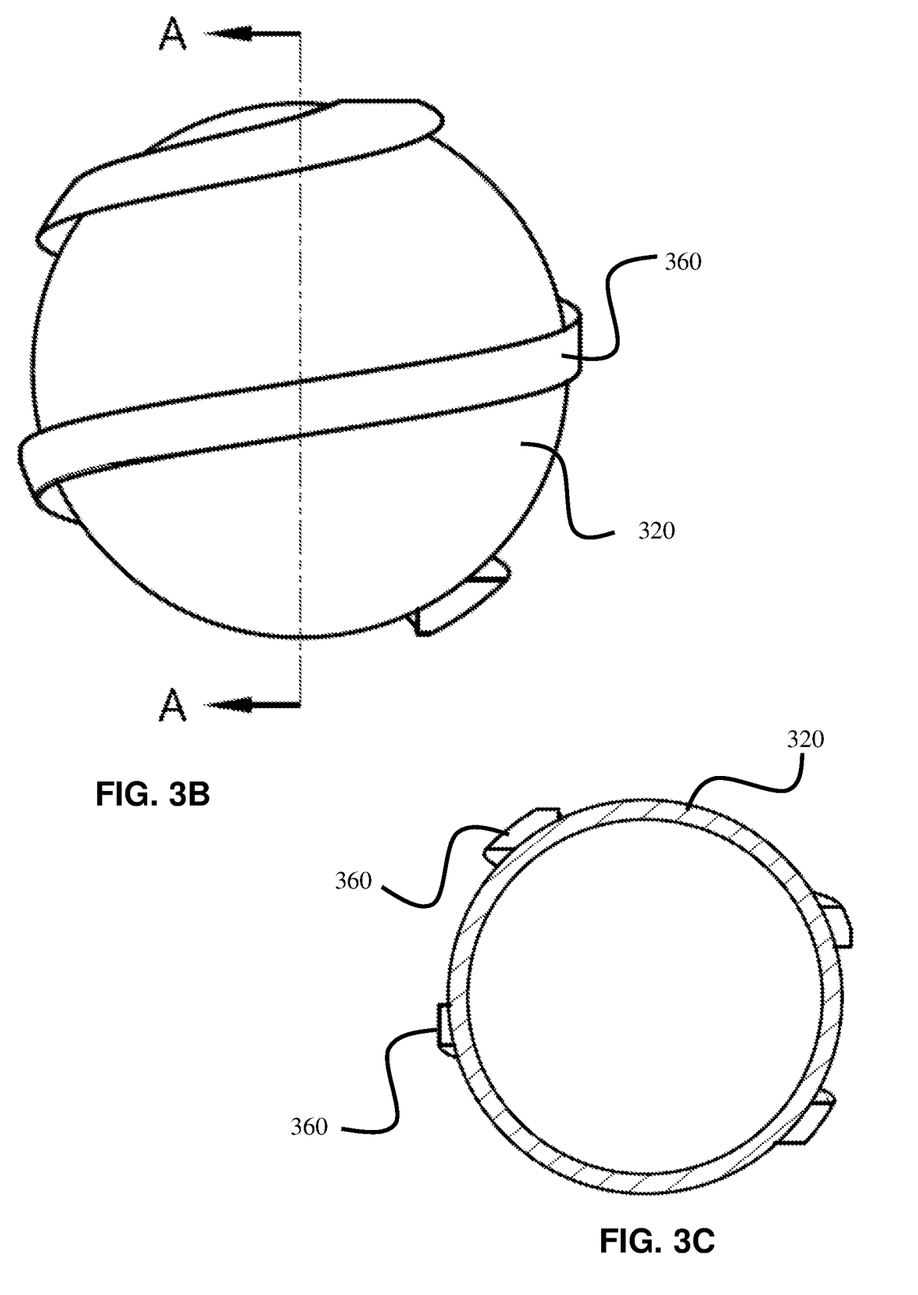
FIGS. 3B and 3C illustrate alternate views of the example embodiment of FIG. 3A with FIG. 3B showing a rotated view and FIG. 3C showing a cutaway view.

In the example embodiment of FIG. 3A, the spherical shape of the drifter avoids the problem of having a bluff object go up and down the water column, as would be the case for a vertical cylinder. This illustrative example features a helical strake that is spiraling along a vertical/longitudinal axis because of the assumption that horizontal velocities will be greater than the vertical velocities, but the helical strake could be oriented at any angle. The helical strake lessens the vortices in the horizontal mostly, where velocities and drag are higher. Along the vertical, velocities are much slower and the drag is lesser than in the horizontal; the spiral still hinders the formation of vortices and of a boundary layer, helping streamline the drifter in the vertical.

The faired, streamlined shapes in the FIG. 3A and FIG. 4 examples help break the boundary layers forming at the top or bottom of the drifter. They also allow for easier buoyancy and ballasting adjustments and help minimize the size and load of the ballasting devices needed to make a bluff object go up and down the water column. In the example embodiment of FIG. 4, the oblong shape also helps the drifter tilt in response to currents with strong shear, where there is a strong gradient in horizontal velocities between the top and the bottom of the drifter. The adjustment in tilt can help the drifter track motion in different directions, both horizontal and vertical.

Alternative Embodiments of a Protrusion and a Flow-Following Apparatus

In one example embodiment, one or more protrusion is provided and configured to be coupled to the surface of a flow-following apparatus whereby the flow-following apparatus more accurately follows a motion of a fluid. In some embodiments, the protrusion comprises one or more helical strake. In some embodiments, the protrusion comprises one or more splitter plate.

In one example embodiment, a flow-following apparatus comprises a body having an exterior surface and one or more protrusion coupled to the exterior surface whereby the flow-following apparatus more accurately follows a fluid motion. In some embodiments, the body is axisymmetric. In some embodiments, the body is cylindrical. In some embodiments, the protrusion comprises a helical strake extending across a portion of the exterior surface, the body is hollow, and the body is configured to float at a surface of the fluid through a positive buoyancy with the body being submerged below the surface and an antenna above the surface. In some embodiments, the flow-following apparatus further comprises a top face on the exterior surface, a bottom face on the exterior surface, and wherein the protrusion comprises a splitter plate at the top face and the bottom face. In some embodiments, the body is spherical, and the protrusion comprises a helical strake extending across a portion of the exterior surface. In some embodiments, the body is oblong and the protrusion comprises a helical strake extending across a portion of the exterior surface. In some embodiments, the flow-following apparatus further comprising a position tracking device. In some embodiments, the flow-following apparatus further comprises a radar reflector. In some embodiments, the flow-following apparatus further comprises an antenna painted with an absorbent paint.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

What is claimed is:

1. A protrusion assembly to be coupled to a surface of a flow-following apparatus, the protrusion assembly comprising:
   a surface element having a length, a width and a height;
   the length being greater than the width and the height;
   the surface element configured to be coupled to the surface of the flow-following apparatus to define one or more protrusion from the surface;
   the surface element comprises a helical surface element;
   the helical surface element having an arcuate cross-sectional profile;
   the helical surface element having an open and continuous shape whereby when the helical surface element is coupled to the surface of the flow-following apparatus, the surface element defines a helical strake on the surface of the flow-following apparatus; and
   whereby the flow-following apparatus more accurately follows a motion of a fluid when the flow-following apparatus is in the fluid.

2. The protrusion assembly of claim 1 wherein:
   the flow-following apparatus comprises an axisymmetric body;
   the motion of the fluid is a flow of the fluid; and
   the helical strake on the surface of the flow-following apparatus is configured to reduce a vortex shedding caused by the flow-following apparatus in the flow of the fluid.

3. The protrusion assembly of claim 2 wherein the axisymmetric body has a spherical shape.

4. The protrusion assembly of claim 2 wherein:
   the axisymmetric body is axisymmetric about a longitudinal axis; and
   the length of the helical strake is configured to allow the helical strake to make at least two revolutions around the longitudinal axis and the surface of the flow-following apparatus.

5. The protrusion assembly of claim 1 wherein the flow-following apparatus is a subsurface flow-following apparatus coupled to a buoyant surface element.

6. The protrusion assembly of claim 1 wherein:
the flow-following apparatus comprises a drifting platform having an instrument suite; and
the protrusion assembly is coupled to the drifting platform whereby:
the protrusion assembly retrofits the drifting platform to follow the motion of the fluid more accurately, and
the protrusion assembly allows the drifting platform to better trace one or more properties of a parcel of the fluid.

7. The flow-following apparatus of claim 1 further comprising a sensor.

8. A protrusion assembly to be coupled to a surface of a flow-following apparatus, the protrusion assembly comprising:
a surface element having a length a width and a height;
the length being greater than the width and the height;
the surface element configured to be coupled to the surface of the flow-following apparatus to define one, or more protrusion from the surface;
whereby the flow-following apparatus more accurately follows a motion of a fluid when the flow-following apparatus is in the fluid; and
wherein the surface element comprises a cylindrical surface element whereby when the cylindrical surface element is coupled to the surface of the flow-following apparatus, the cylindrical surface element defines a splitter plate on the surface of the flow-following apparatus.

9. The protrusion assembly of claim 8 wherein:
the flow-following apparatus comprises a cylindrical body;
the motion of the fluid is a flow of the fluid; and
the splitter plate on the surface of the flow-following apparatus is configured to reduce a vortex shedding caused by the flow-following apparatus in the flow of the fluid.

10. A flow-following apparatus, the flow-following apparatus comprising:
a body having an exterior surface;
one or more protrusion coupled to the exterior surface whereby the flow-following apparatus more accurately follows a motion of a fluid;
wherein the body is an axisymmetric body; and
wherein the one or more protrusion comprises a helical strake extending across a portion of the exterior surface.

11. The flow-following apparatus of claim 10 wherein:
the motion of the fluid is a flow of the fluid; and
the helical strake on the exterior surface of the axisymmetric body is configured to reduce a vortex shedding caused by the axisymmetric body in the flow of the fluid.

12. The flow-following apparatus of claim 10 wherein the helical strake has an arcuate cross-sectional profile.

13. The flow-following apparatus of claim 12 wherein:
the axisymmetric body is axisymmetric about a longitudinal axis; and
a length of the helical strake is configured to allow the helical strake to make at least two revolutions around the longitudinal axis and the exterior surface of the axisymmetric body.

14. The flow-following apparatus of claim 13 wherein:
the axisymmetric body is hollow; and
the axisymmetric body is configured to float at a surface of the fluid through a positive buoyancy with the axisymmetric body being submerged below the surface and an antenna above the surface.

15. The flow-following apparatus of claim 10 further comprising a position tracking device.

16. The flow-following apparatus of claim 10 further comprising a radar reflector.

17. The flow-following apparatus of claim 10 further comprising a sensor.

18. A flow-following apparatus, the flow-following apparatus comprising:
a body having an exterior surface;
a top face on a top of the exterior surface;
a bottom face on a top of the exterior surface;
one or more protrusion coupled to the exterior surface whereby the flow-following apparatus more accurately follows a motion of a fluid;
wherein the body is a cylindrical body; and
wherein the one or more protrusion comprises a splitter plate at the top face and the bottom face.

19. A flow-following apparatus, the flow-following apparatus comprising:
a body having an exterior surface;
one or more protrusion coupled to the exterior surface whereby the flow-following apparatus more accurately follows a motion of a fluid;
wherein the body is spherical having a longitudinal axis; and
wherein the one or more protrusion comprises a helical strake extending at least two revolutions about the longitudinal axis and across the exterior surface.

20. A flow-following apparatus, the flow-following apparatus comprising:
a body having an exterior surface;
one or more protrusion coupled to the exterior surface whereby the flow-following apparatus more accurately follows a motion of a fluid;
wherein the body is oblong having a longitudinal axis; and
wherein the one or more protrusion comprises a helical strake extending at least two revolutions about the longitudinal axis and across the exterior surface.

* * * * *